(12) United States Patent
Lee

(10) Patent No.: US 11,644,095 B1
(45) Date of Patent: May 9, 2023

(54) SLIPPER CLUTCH TRANSMISSION BRAKE

(71) Applicant: Schaeffler Technologies AG & Co. KG, Herzogenaurach (DE)

(72) Inventor: Brian Lee, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/512,774

(22) Filed: Oct. 28, 2021

(51) Int. Cl.
*F16H 57/10* (2006.01)
*F16H 1/28* (2006.01)

(52) U.S. Cl.
CPC .............. *F16H 57/10* (2013.01); *F16H 1/28* (2013.01); *F16D 2200/003* (2013.01)

(58) Field of Classification Search
CPC ...... F16H 57/10; F16H 1/28; F16D 2200/003; F16D 41/086; F16D 41/088; F16D 53/00
See application file for complete search history.

(56) References Cited

U.S. PATENT DOCUMENTS

| | | | |
|---|---|---|---|
| 6,409,001 B1 | 6/2002 | Kerr | |
| 6,557,680 B2 * | 5/2003 | Williams | F16D 11/16 192/38 |
| 7,083,538 B2 * | 8/2006 | Szalony | F16H 3/54 192/84.8 |
| 8,448,766 B2 * | 5/2013 | Smetana | F16D 41/088 192/38 |
| 8,578,804 B2 * | 11/2013 | Fleishman | F16D 41/088 74/339 |
| 2002/0029948 A1 | 3/2002 | Williams | |
| 2014/0155217 A1 | 6/2014 | Rowell et al. | |
| 2014/0274530 A1 * | 9/2014 | Knickerbocker | F16D 27/10 475/150 |

FOREIGN PATENT DOCUMENTS

| | | |
|---|---|---|
| CN | 103307140 | 9/2013 |
| KR | 100617460 | 9/2006 |
| WO | 2020172174 | 8/2020 |

* cited by examiner

*Primary Examiner* — Richard W Ridley
*Assistant Examiner* — Aimee Tran Nguyen

(57) ABSTRACT

A slipper clutch transmission brake includes a clutch housing, a pin, a slipper clutch outer race rotationally fixed in the clutch housing, a slipper clutch inner race, a plurality of first cylindrical rollers, and a clutch inner ring. The clutch housing has a radial aperture and the pin is disposed in the radial aperture. The outer race has inner bidirectional ramps arranged on an inner circumference. The inner race has outer bidirectional ramps arranged on an outer circumference, a notch for receiving the pin, and a split extending axially through its width. The plurality of first cylindrical rollers are arranged in respective gaps formed between the inner and outer bidirectional ramps. The inner ring is arranged to rotate relative to the slipper clutch inner race when the pin is engaged with the notch, and frictionally engage with the slipper clutch inner race when the pin is disengaged from the notch.

15 Claims, 4 Drawing Sheets

SLIPPER CLUTCH TRANSMISSION BRAKE

TECHNICAL FIELD

The present disclosure relates generally to a transmission brake, and more specifically to a slipper clutch transmission brake.

BACKGROUND

Multi-directional couplings are known from U.S. Pat. No. 6,409,001 titled FULL-COMPLEMENT MULTI-DIRECTIONAL COUPLING to Kerr, hereby incorporated by reference as if set forth fully herein.

SUMMARY

Example embodiments broadly comprise a slipper clutch transmission brake including a clutch housing arranged to be rotationally fixed relative to a transmission housing, a pin, a slipper clutch outer race rotationally fixed in the clutch housing, a slipper clutch inner race, a plurality of first cylindrical rollers, and a clutch inner ring. The clutch housing has a radial aperture and the pin is disposed in the radial aperture. The slipper clutch outer race has a plurality of inner bidirectional ramps arranged on an inner circumference, and an outer race axial width. The slipper clutch inner race has a plurality of outer bidirectional ramps arranged on an outer circumference, a notch for receiving the pin, an inner race axial width, greater than the outer race axial width, and a split extending axially through an entirety of the inner race axial width. The plurality of first cylindrical rollers are arranged in respective gaps formed between the plurality of inner bidirectional ramps and the plurality of outer bidirectional ramps. The clutch inner ring is arranged to rotate relative to the slipper clutch inner race when the pin is engaged with the notch, and frictionally engage with the slipper clutch inner race when the pin is disengaged from the notch In an example embodiment, the clutch housing includes a gear for engaging a mating gearing in the transmission. In some example embodiments, the clutch inner ring includes a ring gear for a planetary gearset. In some example embodiments, the clutch inner ring has an inner ring housing with a plurality of first axial protrusions, and the ring gear has a plurality of second axial protrusions drivingly engaged with the first axial protrusions. In an example embodiment, each of the plurality of first axial protrusions has a first radially inwardly facing notch, each of the plurality of second axial protrusions has a second radially inwardly facing notch, and the clutch inner ring has a retaining ring installed in the first and second radially inwardly facing notches to axially retain the ring gear in the inner ring housing.

In some example embodiments, the slipper clutch transmission brake includes a radial bearing arranged radially between the clutch housing and the clutch inner ring to radially position the clutch inner ring in the clutch housing. In an example embodiment, the slipper clutch outer race is arranged on a first axial side of the clutch housing and the radial bearing is arranged on a second axial side of the clutch housing, opposite the first axial side. In some example embodiments, the radial bearing is a roller bearing including a plurality of second cylindrical rollers installed in a roller bearing cage and a radial bearing sleeve installed in the clutch housing. In an example embodiment, the clutch housing is made from aluminum and the radial bearing sleeve provides a hardened surface for the plurality of second cylindrical rollers to ride on.

In an example embodiment, the clutch housing comprises an outer cylindrical surface with a plurality of scallops arranged for engaging complementary features in the transmission housing to rotationally fix the clutch housing relative to the transmission housing.

Other example embodiments broadly comprise a transmission including the slipper clutch transmission brake, the transmission housing, and an actuator arranged to radially displace the pin to engage and disengage with the notch. In an example embodiment, the slipper clutch transmission brake has a spring arranged to urge the pin radially outwards to disengage with the notch.

In some example embodiments, the transmission includes a planetary carrier and a plurality of planetary gears rotatable about respective shafts fixed to the planetary carrier, and the clutch inner ring has a ring gear drivingly engaged with the plurality of planetary gears. In some example embodiments, the transmission has a sun gear drivingly engaged with the plurality of planetary gears, and the ring gear, the sun gear and the plurality of planetary gears form a planetary gearset. In an example embodiment, the slipper clutch transmission brake is arranged to brake the ring gear for torque transmission between the sun gear and the planet carrier when the pin is disengaged from the notch, and permit rotation of the ring gear so that torque from the sun gear is not transmitted to the planetary carrier, and vice versa, when the pin is engaged with the notch.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
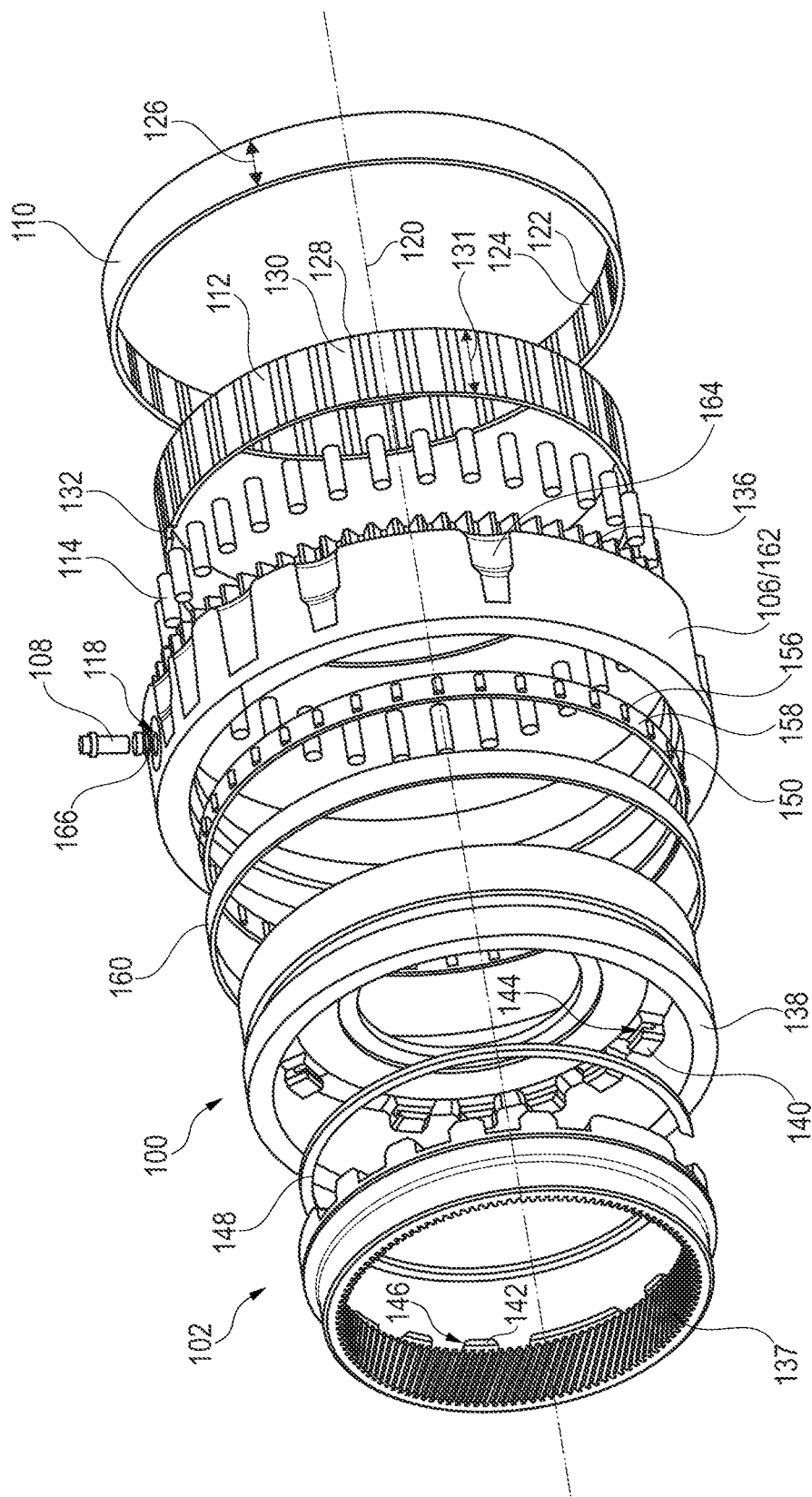
FIG. 1 illustrates an exploded view of a slipper clutch transmission brake according to an example embodiment.
Figure 2:
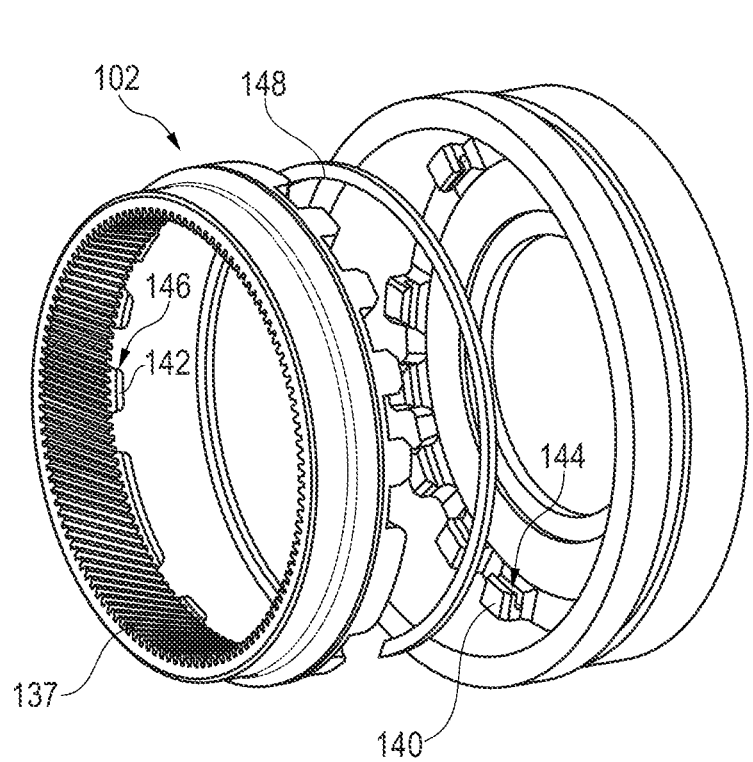
FIG. 2 illustrates an exploded view of a clutch inner ring of the slipper clutch transmission brake of FIG. 1.
Figure 3:
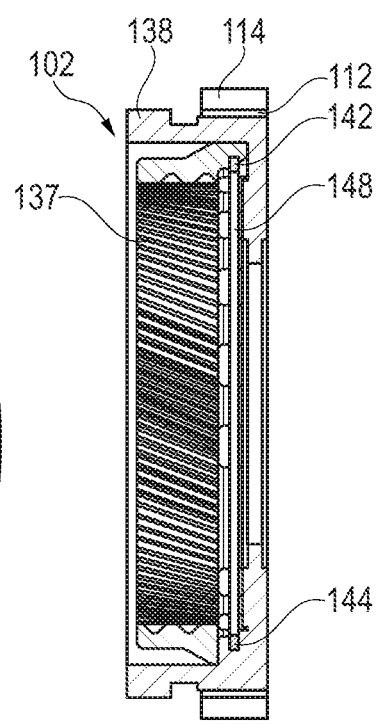
FIG. 3 illustrates a cross-sectional view of the clutch inner ring of FIG. 2.
Figure 4:
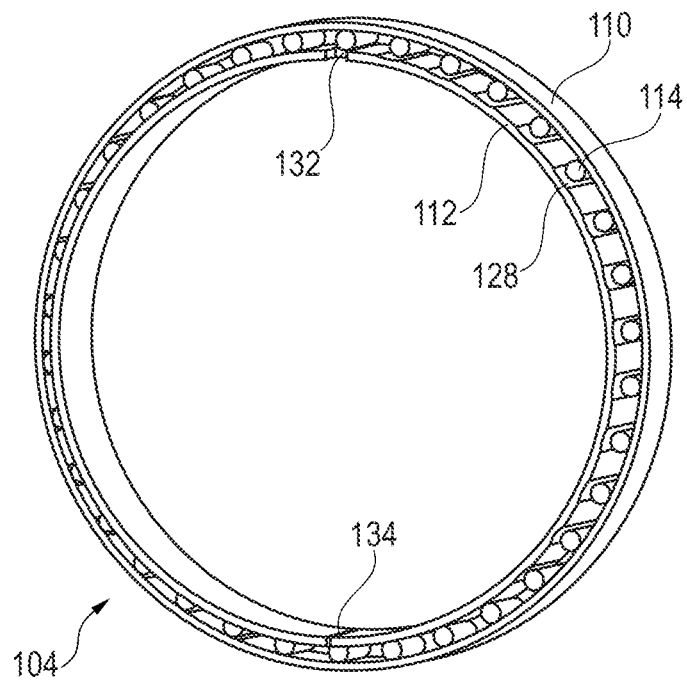
FIG. 4 illustrates a perspective view of a slipper clutch assembly of the slipper clutch transmission brake of FIG. 1.

The following description is made with reference to FIGS. 1-4. FIG. 1 illustrates an exploded view of slipper clutch transmission brake 100 according to an example embodiment. FIG. 2 illustrates an exploded view of clutch inner ring 102 of the slipper clutch transmission brake of FIG. 1. FIG. 3 illustrates a cross-sectional view of the clutch inner ring of FIG. 2. FIG. 4 illustrates a perspective view of slipper clutch assembly 104 of the slipper clutch transmission brake of FIG. 1. Slipper clutch transmission brake 100 includes clutch housing 106, pin 108, slipper clutch outer race 110, slipper clutch inner race 112, cylindrical rollers, 114, and clutch inner ring 102. The clutch housing is arranged to be rotationally fixed relative to a transmission housing as described in more detail below.

Clutch housing 106 includes radial aperture 118 and pin 108 is disposed in the radial aperture. By radial aperture I mean an aperture that extends perpendicular to axis 120 in a radial direction. Slipper clutch outer race 110 is rotationally fixed in the clutch housing by a press-fit or a combination of a cutting spline and press-fit, for example. Slipper clutch outer race may also be fixed in the clutch housing by welding, adhesives, or mechanical fasteners, for example. To be clear, outer race 110 may be fixed in the clutch housing using any known fixing method. Slipper clutch outer race 110 includes inner bidirectional ramps 122, arranged on inner circumference 124, and axial width 126, and inner race 112 includes outer bidirectional ramps 128, arranged on outer circumference 130, and inner race axial width 131, greater than axial width 126. By bidirectional ramps, I mean that the ramps extend radially inwards (or outwards) in both circumferential directions. For example, from a radially innermost point of an inner bidirectional ramp 122, the ramp extends radially outwards in a clockwise direction, and, from the same innermost point, the ramp extends radially outwards in a counter-clockwise direction. Outer bidirectional ramps are similarly formed except that the ramp extends radially inwards in both circumferential directions from an outer most point.

Cylindrical rollers 114 are arranged in respective gaps formed between the plurality of inner bidirectional ramps and the plurality of outer bidirectional ramps. That is, outer bidirectional ramps and the inner bidirectional ramps are circumferentially aligned so that the radially innermost points and the radially outermost points are aligned and the rollers are disposed in gaps between pairs of inner bidirectional ramps aligned with outer bidirectional ramps. As will be described in more detail below, when the innermost and outermost points are misaligned due to rotation of the inner and/or outer races, the rollers move along the ramps to radially expand the outer race and radially compress the inner race. Slipper clutch inner race 112 includes notch 132 for receiving pin 108 and split 134 extending axially through an entirety of the inner race axial width. That is, an inner surface of slipper clutch inner race 112 would be cylindrical but for the axial split.

Figure 5A:
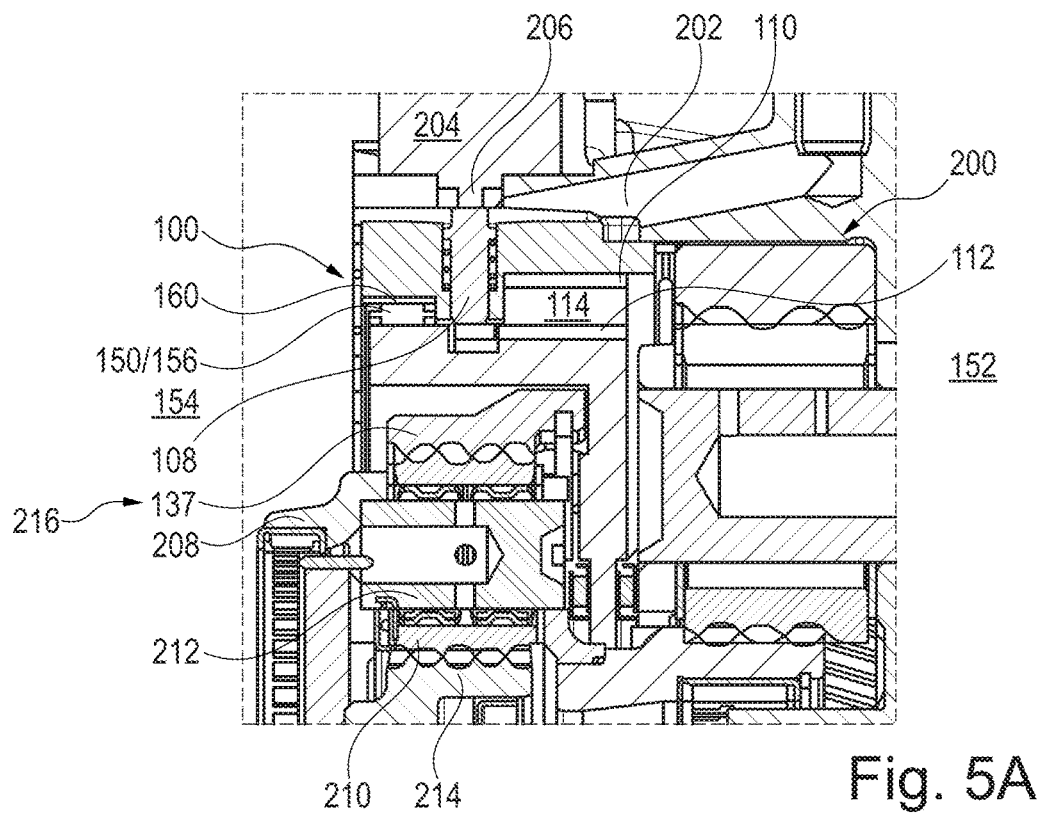
FIG. 5A illustrates a partial cross-sectional view of a transmission including the slipper clutch transmission brake of FIG. 1 shown with a pin disengaged.
Figure 5B:
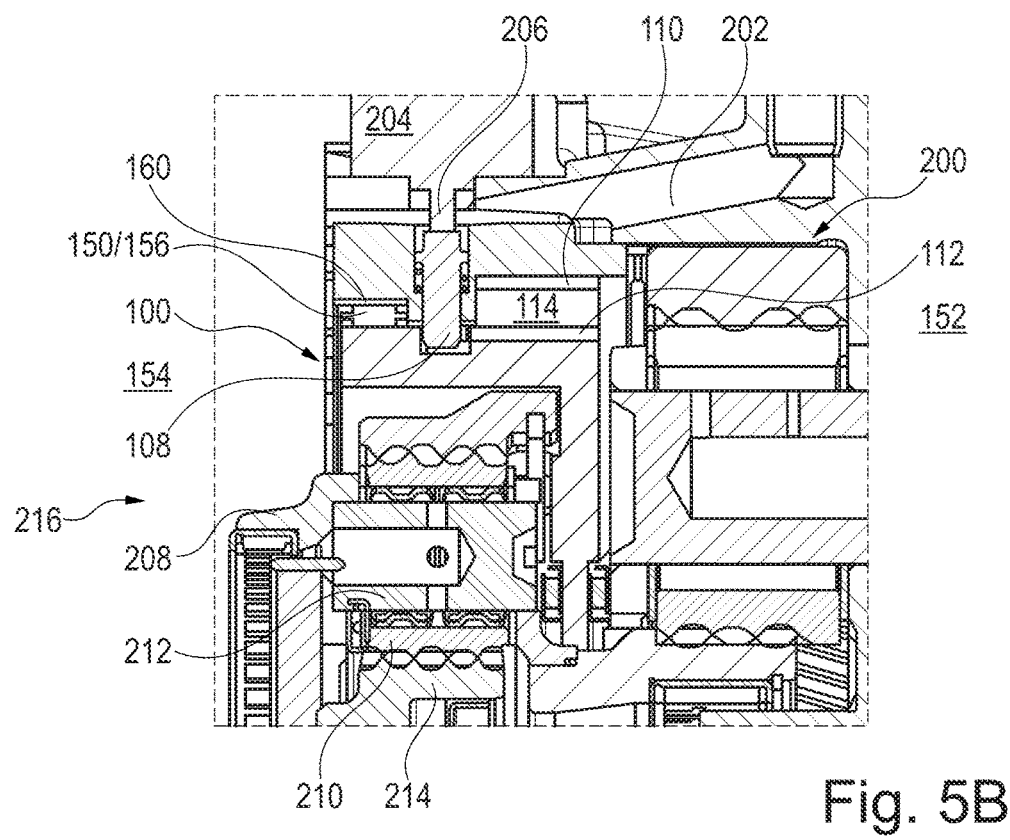
FIG. 5B illustrates a partial cross-sectional view of a transmission including the slipper clutch transmission brake of FIG. 1 shown with a pin engaged.

Axial split 134 allows expanding and compressing of the inner race to engage and disengage the slipper clutch. Clutch inner ring 102 is arranged to rotate relative to the slipper clutch inner race when the pin is engaged with the notch (as shown in FIG. 5B), and frictionally engage with the slipper clutch inner race when the pin is disengaged from the notch (as shown in FIG. 5A). In other words, when the pin is engaged with the notch, the inner race is rotationally aligned with the outer race (because the pin is positioned in aperture 118 of clutch housing 106 and the outer race is fixed in the clutch housing, for example) and rollers 114 are disposed in the gaps between the ramps. But once the pin is removed from the notch, friction between the inner race and the inner ring rotates the inner race when the inner ring rotates relative to the stationary clutch housing. Once the inner race rotates, the rollers roll on the ramps and compress the inner race against the inner ring, increasing the friction and moving the rollers further up the ramps to further compress the inner race. Thus, once the pin is pulled, the slipper clutch transmission brake is self-energizing and holds the inner ring stationary with the clutch housing.

It should be noted that the initial friction between the inner race and the inner ring is minimal and is easily overcome by the pin because the rollers are in the gaps. The initial friction may result from slight variations in concentricity between the inner race and the inner ring and/or a fluid film from a lubricant present in the transmission, for example. But once the pin is removed and the inner race is allowed to rotate, the friction increases quickly to brake the inner ring. It should also be noted that, although the outer race is not split, that same radial forces that compress the inner race will act on the outer race to further increase friction between the outer race and the clutch housing so that a fixing torque between the clutch housing and the outer race may be less than a torque capacity of the transmission brake slipper clutch. Once torque is removed from the inner ring, the rollers move back into the gaps, the inner race aligns with the outer race, and the pin can be re-engaged with the notch.

Clutch housing 106 includes gear 136 for engaging a mating gearing in the transmission and clutch inner ring 102 includes ring gear 137 for a planetary gearset as described in more detail below. Clutch inner ring 102 includes inner ring housing 138 with axial protrusions 140, and ring gear 137 includes axial protrusions 142 drivingly engaged with axial protrusions 140. By drivingly engaged, I mean that axial protrusions 140 and 142 are complementary and, when they are circumferentially aligned, they contact one another to transmit torque between the ring gear and the inner ring housing. By circumferentially aligned, I mean that a circumferential line drawn about axis 120 passes through both protrusions 140 and protrusions 140.

Each of axial protrusions 140 includes radially inwardly facing notch 144 and each of axial protrusions 142 includes radially inwardly facing notch 146. Clutch inner ring 102 includes retaining ring 148 installed in notches 144 and 146 to axially retain the ring gear in the inner ring housing. In other words, retaining ring 148 assures that ring gear 137 and inner ring housing 138 stay circumferentially aligned. It should be noted that, although clutch inner ring 102 is as an assembly of ring gear 137 and inner ring housing 138, the inner ring may be integrally formed from a single piece of material. In other words, some embodiments (not shown) may include ring gear 137 formed as part of inner ring housing 138.

The following description is made with reference to FIGS. 1-5B. FIG. 5A illustrates a partial cross-sectional view of transmission 200 including slipper clutch transmission brake 100 of FIG. 1 shown with pin 108 disengaged. FIG. 5B illustrates a partial cross-sectional view of transmission 200 including slipper clutch transmission brake 100 of FIG. 1 shown with pin 108 engaged. Slipper clutch transmission brake 100 includes radial bearing 150 arranged radially between the clutch housing and the clutch inner ring to radially position the clutch inner ring in the clutch housing. As can be seen in FIGS. 5A and 5B, for example, the slipper clutch outer race is arranged on axial side 152 of the clutch housing and radial bearing 150 is arranged on axial side 154 of the clutch housing, opposite axial side 152.

Radial bearing 150 is a roller bearing including cylindrical rollers 156 installed in roller bearing cage 158 and radial bearing sleeve 160 installed in the clutch housing. Clutch housing 106 is made from aluminum and the radial bearing sleeve provides a hardened surface for cylindrical rollers 156 to ride on. Although radial bearing 150 is shown as a roller bearing, other embodiments are possible. For example, radial bearing 150 may be a bushing in some embodiments (not shown). Clutch housing 106 includes outer cylindrical surface 162 with scallops 164 arranged for engaging complementary features in the transmission housing (e.g., FIG. 7) to rotationally fix the clutch housing relative to the transmission housing.

Figure 6:
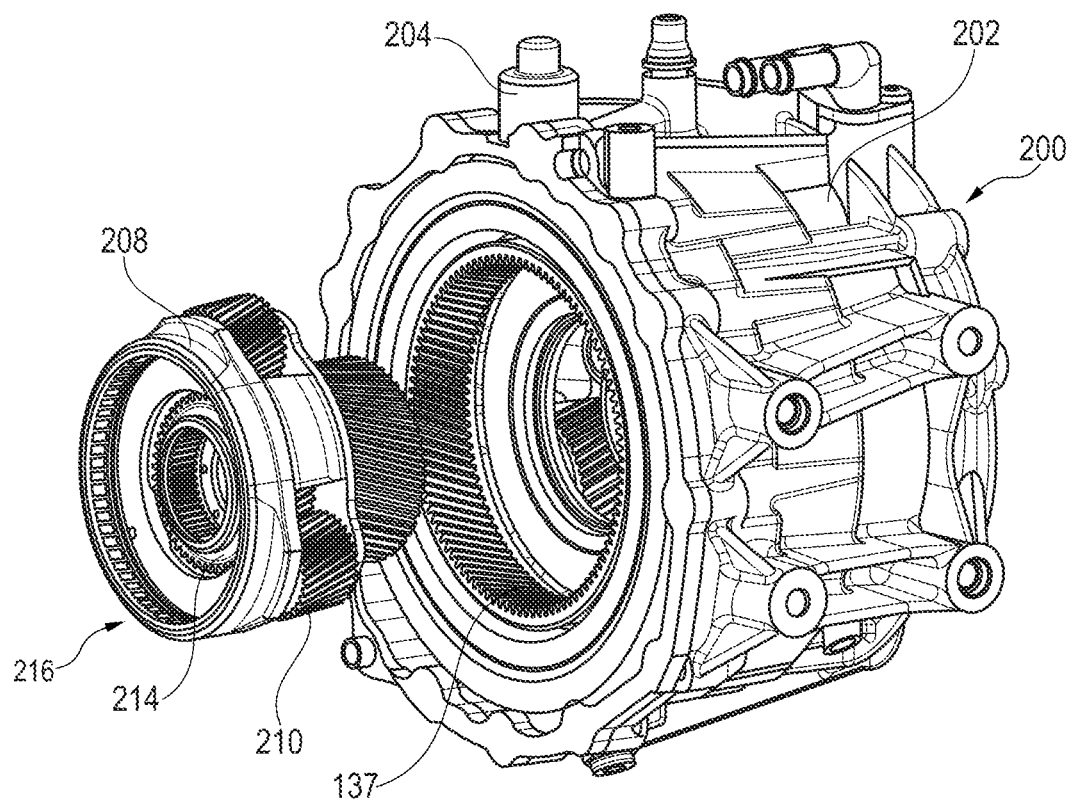
FIG. 6 illustrates a partial exploded view of a transmission.
Figure 7:
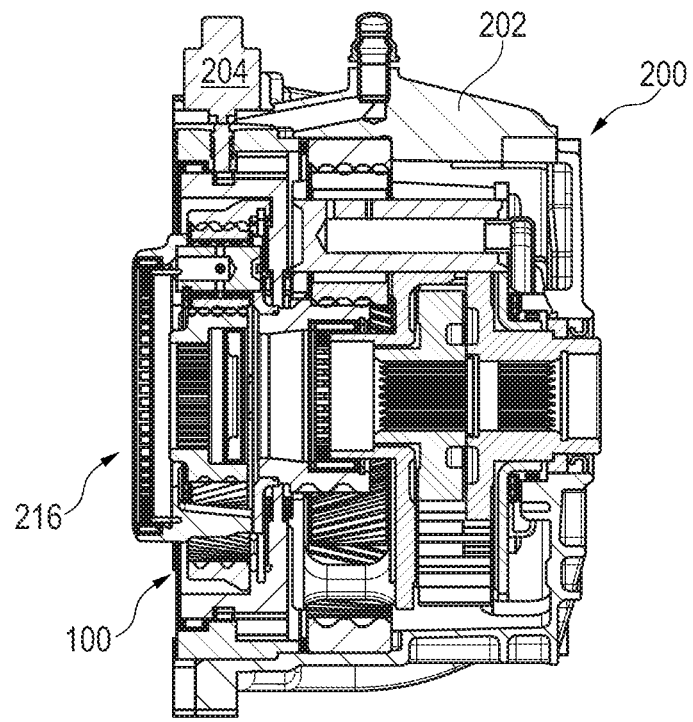
FIG. 7 illustrates a cross-sectional view of the transmission of FIG. 6.

The following description is made with reference to FIGS. 1-7. FIG. 6 illustrates a partial exploded view of transmission 200. FIG. 7 illustrates a cross-sectional view of transmission 200 of FIG. 6. Transmission 200 includes slipper clutch transmission brake 100, transmission housing 202, and actuator 204 arranged to radially displace the pin to engage and disengage with the notch. That is, slipper clutch transmission brake includes spring 166 arranged to urge the pin radially outwards to disengage with the notch. and actuator 204 includes plunger 206 arranged to displace the pin radially inwards to engage with the notch. In other words, when the actuator is engaged, the plunger is displaced radially inwards, displacing pin 108 radially inwards to engage notch 132 in outer race 110. But when the actuator is disengaged, the plunger retracts and spring 166 urges the pin radially outwards, disengaging from the notch to allow engagement of the slipper clutch as described above. Actuator 204 may be an electrical actuator, a hydraulic actuator or a vacuum actuator, for example.

Transmission 200 also includes planetary carrier 208 and planetary gears 210 rotatable about respective shafts 212 fixed to the planetary carrier. As discussed above, clutch inner ring 102 includes ring gear 137, and the ring gear is drivingly engaged with the planetary gears. Transmission 200 includes sun gear 214 drivingly engaged with the planetary gears and the ring gear, the sun gear and the planetary gears forms planetary gearset 216. Slipper clutch transmission brake 100 is arranged to brake the ring gear for torque transmission between the sun gear and the planet carrier when the pin is disengaged from the notch, and permit rotation of the ring gear so that torque from the sun gear is not transmitted to the planetary carrier, and vice versa, when the pin is engaged with the notch.

That is, when rotation of the ring gear is unrestricted, the relative rotation of the planetary gear elements prevents torque transmission between the sun gear and the planetary carrier but, when the slipper clutch is engaged and rotation of the ring gear is locked, the ring gear reacts against the planetary gears and torque from the sun gear is output via the planetary carrier, and vice versa. Transmission 200 may be used in an electric vehicle, for example. During operation, actuator 204 may be actuated to engage the pin with the notch to allow transmission components to freewheel relative to an electric motor connected to the sun gear or planetary carrier, for example. De-energizing the actuator disengages the pin to lock the slipper clutch transmission brake so that torque from the electric motor is transmitted to the transmission, and vice versa.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Slipper clutch transmission brake
102 Clutch inner ring
104 Slipper clutch assembly
106 Clutch housing
108 Pin
110 Slipper clutch outer race
112 Slipper clutch inner race
114 Cylindrical rollers (first)
118 Radial aperture
120 Axis
122 Inner bidirectional ramps
124 Inner circumference (outer race)
126 Axial width (outer race)
128 Outer bidirectional ramps
130 Outer circumference (inner race)
131 Axial width (inner race)
132 Notch
134 Axial split
136 Ring gear
138 Inner ring housing
140 Axial protrusions (first)
142 Axial protrusions (second)
144 Radially inwardly facing notch (first)
146 Radially inwardly facing notch (second)
148 Retaining ring
150 Radial bearing
152 Axial side (first)

154 Axial side (second)
156 Cylindrical rollers (second)
158 Roller bearing cage
160 Radial bearing sleeve
162 Outer cylindrical surface
164 Scallops
166 Spring
200 Transmission
202 Transmission housing
204 Actuator
206 Plunger
208 Planetary carrier
210 Planetary gears
212 Shaft
214 Sun gear
216 Planetary gearset

What is claimed is:

1. A slipper clutch transmission brake, comprising:
a clutch housing arranged to be rotationally fixed relative to a transmission housing, the clutch housing comprising a radial aperture;
a pin disposed in the radial aperture;
a slipper clutch outer race rotationally fixed in the clutch housing, the slipper clutch outer race comprising:
a plurality of inner bidirectional ramps arranged on an inner circumference;
an outer race axial width;
a slipper clutch inner race comprising:
a plurality of outer bidirectional ramps arranged on an outer circumference;
a notch for receiving the pin; and
an inner race axial width, greater than the outer race axial width; and
a split extending axially through an entirety of the inner race axial width;
a plurality of first cylindrical rollers arranged in respective gaps formed between the plurality of inner bidirectional ramps and the plurality of outer bidirectional ramps; and
a clutch inner ring arranged to:
rotate relative to the slipper clutch inner race when the pin is engaged with the notch; and
frictionally engage with the slipper clutch inner race when the pin is disengaged from the notch.

2. The slipper clutch transmission brake of claim 1 wherein the clutch housing comprises a gear for engaging a mating gearing in the transmission.

3. The slipper clutch transmission brake of claim 1 wherein the clutch inner ring comprises a ring gear for a planetary gearset.

4. The slipper clutch transmission brake of claim 3 wherein:
the clutch inner ring further comprises an inner ring housing comprising a plurality of first axial protrusions; and
the ring gear comprises a plurality of second axial protrusions drivingly engaged with the first axial protrusions.

5. The slipper clutch transmission brake of claim 4 wherein:
each of the plurality of first axial protrusions comprises a first radially inwardly facing notch;

each of the plurality of second axial protrusions comprises a second radially inwardly facing notch; and
the clutch inner ring further comprises a retaining ring installed in the first and second radially inwardly facing notches to axially retain the ring gear in the inner ring housing.

6. The slipper clutch transmission brake of claim 1 further comprising a radial bearing arranged radially between the clutch housing and the clutch inner ring to radially position the clutch inner ring in the clutch housing.

7. The slipper clutch transmission brake of claim 6 wherein:
the slipper clutch outer race is arranged on a first axial side of the clutch housing; and
the radial bearing is arranged on a second axial side of the clutch housing, opposite the first axial side.

8. The slipper clutch transmission brake of claim 6 wherein the radial bearing is a roller bearing comprising:
a plurality of second cylindrical rollers installed in a roller bearing cage; and
a radial bearing sleeve installed in the clutch housing.

9. The slipper clutch transmission brake of claim 8 wherein:
the clutch housing is made from aluminum; and
the radial bearing sleeve provides a hardened surface for the plurality of second cylindrical rollers to ride on.

10. The slipper clutch transmission brake of claim 1 wherein the clutch housing comprises an outer cylindrical surface with a plurality of scallops arranged for engaging complementary features in the transmission housing to rotationally fix the clutch housing relative to the transmission housing.

11. A transmission comprising:
the slipper clutch transmission brake of claim 1;
the transmission housing; and
an actuator arranged to radially displace the pin to engage and disengage with the notch.

12. The transmission of claim 11 wherein the slipper clutch transmission brake further comprises a spring arranged to urge the pin radially outwards to disengage with the notch.

13. The transmission of claim 11 further comprising:
a planetary carrier, and
a plurality of planetary gears rotatable about respective shafts fixed to the planetary carrier, wherein the clutch inner ring comprises a ring gear drivingly engaged with the plurality of planetary gears.

14. The transmission of claim 13 further comprising a sun gear drivingly engaged with the plurality of planetary gears, wherein the ring gear, the sun gear and the plurality of planetary gears form a planetary gearset.

15. The transmission of claim 14 wherein the slipper clutch transmission brake is arranged to:
brake the ring gear for torque transmission between the sun gear and the planet carrier when the pin is disengaged from the notch; and
permit rotation of the ring gear so that torque from the sun gear is not transmitted to the planetary carrier, and vice versa, when the pin is engaged with the notch.

* * * * *